United States Patent

Watanabe et al.

[11] Patent Number: 5,866,490
[45] Date of Patent: Feb. 2, 1999

[54] MONOLITHIC REFRACTORY AND GUNNING MATERIAL USING THE REFRACTORY

[75] Inventors: Akira Watanabe; Hirokuni Takahashi; Shigeyuki Takanaga; Yasutoshi Mizuta, all of Okayama, Japan

[73] Assignee: Kyushu Refractories Co., Ltd., Okayama, Japan

[21] Appl. No.: 737,444

[22] PCT Filed: Feb. 26, 1996

[86] PCT No.: PCT/JP96/00453

§ 371 Date: Dec. 26, 1996

§ 102(e) Date: Dec. 26, 1996

[87] PCT Pub. No.: WO96/27568

PCT Pub. Date: Dec. 9, 1996

[30] Foreign Application Priority Data

Mar. 3, 1995 [JP] Japan ...................................... 7-70689
Mar. 3, 1995 [JP] Japan ...................................... 7-70690

[51] Int. Cl.$^6$ .................................................. C04B 35/52
[52] U.S. Cl. ........................... 501/99; 501/95.1; 501/100; 501/101
[58] Field of Search ............................ 501/99, 95.1, 100, 501/101, 103, 108, 109, 113, 116

[56] References Cited

U.S. PATENT DOCUMENTS

| | | | |
|---|---|---|---|
| 3,070,449 | 12/1962 | Davies et al. | 501/109 |
| 3,285,760 | 11/1966 | Hildinger et al. | 501/109 |
| 3,288,616 | 11/1966 | Bowman | 501/109 |
| 3,322,551 | 5/1967 | Bowman | 501/109 |
| 3,351,476 | 11/1967 | Weaver et al. | 501/99 |
| 4,008,194 | 2/1977 | Shinani | 501/99 |
| 4,102,694 | 7/1978 | Sasaki et al. | 501/100 |
| 4,208,214 | 6/1980 | Stein et al. | 501/101 |
| 4,261,752 | 4/1981 | Danjyo et al. | 501/113 |
| 4,585,485 | 4/1986 | Shikano et al. | 501/99 |

FOREIGN PATENT DOCUMENTS

| | | | |
|---|---|---|---|
| 356098274A | 8/1981 | Japan . | |
| 5698274 | 8/1981 | Japan | C09K 3/10 |
| 5823351 | 5/1983 | Japan . | |
| 6212676 | 1/1987 | Japan . | |
| 6056538 | 3/1994 | Japan . | |
| 873279 | 3/1996 | Japan . | |

OTHER PUBLICATIONS

Patent Abstracts of Japan vol. 096, No. 007, 31 Jul. 1996 Abstract of JP08073279A (Kyushu Refract Co. Ltd.) 19 Mar. 1996.

*Primary Examiner*—Michael Marcheschi
*Attorney, Agent, or Firm*—Fulbright & Jaworski, LLP.

[57] ABSTRACT

Disclosed is a monolithic refractory comprising 1 to 30 weight parts of pitch having 65 to 90 wt.-% of fixed carbon and a softening point of 250° to 350° C. to form a carbon bond, relative to 100 weight parts of refractory material so as to form carbon bond. The monolithic refractory can contain 0.01 to 0.5 weight parts of carbon fiber. The composition of the invention may be used as any type of monolithic refractory such as gunning material, casting material, in particular, aqueous type casting material, burning type hot repairing mix, mortar, Tamping material, and any basic, neutral, or acid refractory material may be used. The monolithic refractory is capable of solving the drawbacks of the conventional monolithic refractories such as rupture, lack of low shrinkage, low bonding strength, low hot strength, and having both superior strength and superior applicability.

11 Claims, No Drawings

MONOLITHIC REFRACTORY AND GUNNING MATERIAL USING THE REFRACTORY

This application is a 371 of International Patent Application No. PCT/JP96/00453, filed Feb. 26, 1996.

BACKGROUND OF THE INVENTION

The present invention relates to monolithic refractories such as casting material, gunning material, burning type hot repairing mix, mortar, tamping material, ramming material or the like to be used as lining or repairing material for various furnaces, molten-metal vessels used in pig-iron or steel making process.

In recent years, with increasing severity of operating conditions in pig-iron and steel making industries, as monolithic refractory to be used as lining material or repairing material for a variety of molten-metal vessels such as a converter, a ladle, a torpedo-car or the like, there have generally been used carbon-bonded materials having superior corrosion resistance and spalling resistance.

This is because the conventional materials using sodium phosphate or sodium silicate have the drawback in strength that these materials when penetrated by slag generate a low-melting point compound which causes melting and damage of the materials. In order to cope with this, there have been proposed a method directly using bonding agents such as alumina cement, sodium phosphate or sodium silicate with addition of graphite or coke thereto and a further method using these bonding materials in combination with tar or pitch to form carbon bond.

In the case of burning type hot repairing mix, there is also known a method using tar or pitch alone as bonding material. Also, there has been developed a further method of using phenol resin in order to render a period needed for obtaining bonding strength shorter than that needed when using tar or pitch.

In the case of monolithic refractory using tar or pitch, when this is used as casting material for example, a great amount of volatile component emits from the tar or pitch when the temperature is raised at the time of its application, whereby there occur rupture and environmental problem as well. For this reason, it is difficult to use these materials by a large amount, so that it has not been possible to cause the material to sufficiently provide its effect of preventing slag penetration which is an advantage of the carbonaceous material. Also, when used as gunning material, it requires use water on its application. Then, after evaporation of the water, pitch is once melted and then produces the carbon bond. However, in the case of the ordinary pitch, the pitch has low viscosity at the time of its melting. So that, when the pitch is added by a certain amount, there occurs such problem as deformation or sagging. Therefore, in this case too, it has not been possible to add a large amount of pitch. Further, in the case of burning type hot repairing mix, there are two types, i.e. one which hardens after flows on its introduction and the other which hardens immediately when introduced. In the case of the former type which hardens after flows, it is necessary to use pitch having a low softening point. This inevitably leads to low residual carbon, so that the material cannot provide sufficient hot strength or adhering strength. On the other hand, in the case of the latter type which hardens immediately at the time of its introduction, this type is intended to be applied to a sloped surface. Thus, this material must be hardened at the position of its introduction. However, in the case of the ordinary pitch or tar, when added by a necessary amount, the pitch or tar, because of its low viscosity, sags from the position of introduction, so that it cannot be applied to the target position.

On the other hand, in the case of monolithic refractory using phenol resin, if used as repairing material, it provides the advantage of shorter time required of the material to provide the bonding strength in comparison with tar or pitch. But, this material has drawbacks of significant shrinkage occurring in the applied material and weak bonding strength.

For the above-described reasons, there has been a demand for improved monolithic refractory which is superior in both applicability and durability by solving the drawbacks of the conventional monolithic refractories using carbon bond such as rupture, lack of volume stability, low adhesive strength, low hot strength and so on.

THE INVENTION

The present inventors have conducted various researches to obtain such monolithic refractory using carbon bond as capable of solving the above-described drawbacks of the conventional art and have found out that these drawbacks of the conventional art can be solved by using, as bonding material, pitch having a high residual carbon with a high softening point and thus achieved the present invention. The inventors have also found out that use of carbon fiber in addition to the pitch having a high actual carbon ratio with a high softening point or in combination with phenol resin having a high molecular weight can achieve further distinguished effect.

Namely, a first monolithic refractory according to the present invention, is characterized in that the refractory contains 1 to 30 weight parts of pitch having 65 to 90 wt % of fixed carbon and a softening point of 250° to 350° C. to form carbon bond, relative to 100 weight parts of refractory material.

A second monolithic refractory according to the present invention, is characterized in that the refractory contains 1 to 30 weight parts of pitch having 65 to 90 wt % of fixed carbon and a softening point of 250° to 350° C. to form carbon bond, and 0.01 to 0.5 weight part of carbon fiber, relative to 100 weight parts of refractory material.

The refractory material used in the present invention is for use in an ordinary refractory and comprises one or more than two kinds selected, in consideration of a particular molten-metal vessel to be repaired, from the group consisting of basic oxide such as magnesia, calcia or the like, nuetral oxide such as alumina, spinel, chromia or the like, acid oxide such as silica, zirconia or the like, and non-oxide materials such as silicon carbide, silicon nitride or the like. For instance, for use in a converter or a blast pot for steel making ladle, basic refractory material such as magnesia is mainly used. For use in a torpedo-car, hot-metal ladle, trough for pig iron making, alumina type refractory material is used. In this case, carbonaceous material such as graphite having slag wetting resistance may be used in combination.

The characterizing feature of the invention lies in the use of the particular pitch. As this pitch used in the present invention, petroleum pitch, coal pitch, synthetic pitch based on naphthalene or the like, or any of these may be employed. This pitch has 65 to 90 wt % of fixed carbon and a softening point of 250° to 350° C. The softening point higher than 250° C. is provided for the reason mentioned later to avoid excessive initial fluidity when melted. On the other hand, if the softening point is higher than 350° C., this will result in excessive viscosity when the pitch is melted. As a result, uniform bonding strength cannot be obtained and durability of the applied vessels will suffer. Further, if the fixed carbon of pitch is not greater than 65 wt % containing large amount of volatile component, this will lead to occurrence of rupture in the case of casting material and may lead to violent smoke emission at the time of gunning in the case of gunning material. Conversely, if the amount is greater than 90 wt %, this will result in insufficient fluidity on melting, which in turn leads of non-uniform dispersion and consequently non-uniform uniform quality in the applied material.

The monolithic refractory according to the present invention may be used suitably as repairing material to be sprayed or as casting material especially aqueous type casting material.

Further, the monolithic refractory according to the present invention may be used suitably also as burning type hot repairing mix, mortar or as tamping or ramming material.

Regarding the amount of pitch, referring to its optimum amount for respective type of monolithic refractory, relative to 100 weight parts of refractory material, it is preferred that the amount be 1 to 15 weight parts in the case of gunning material, 1 to 12 weight parts in the case of casting material, 1 to 30 weight parts in the case of burning type hot repairing mix and 2 to 10 weight parts in the case of tamping or ramming material. If the used amount is less than each specified lower limit, the addition does not provide its effect. Conversely, if the amount is more than each specified upper limit, the physical properties of the applied material deteriorates and so does its durability consequently. Therefore, neither is preferred. It is also preferred that the pitch used herein contains a large amount of isotropic component, because such pitch may be readily formed into glassy carbon at the time of carbonization thereof thereby to improve the friction resistance of the applied vessel. It is further preferred that this pitch be used in the form of pellets most of which have a particle size ranging from 0.1 to 1 mm.

A gunning material according to the present invention comprises 1 to 15 weight parts of pitch having 65 to 90 wt % of fixed carbon and a softening point of 250° to 350° C. to form carbon bond, relative to 100 wt % of refractory material. More preferably, the material further comprises 2 to 10 weight parts of powdery heat-hardening type phenol resin having an average molecular weight of 2000 or more.

A further gunning material according to the present invention comprises: 1 to 15 weight parts of pitch having 65 to 90 wt % of fixed carbon and a softening point of 250° to 350° C.; 2 to 10 weight parts of powderly heat-hardening type phenol resin having an average molecular weight of 2000 or more; and 0.01 to 0.5 weight parts of carbon fiber, and results in forming bond.

In the case of the gunning material where its adhesive strength relative to a surface to be mended is needed, phenol resin may be used in combination. Rather than using conventional phenol resin, it is preferred to use powderly heat-hardening type phenol resin having an average molecular weight of 2000 or more in the range of 2 to 10 weight parts. The use of phenol resin having an average molecular weight of 2000 or more is provided for minimizing its softening when heated and also generation of gas from the phenol resin which renders the repairing material porous. If its used amount is not greater than 2 weight parts, the initial adhesion will suffer. Conversely, if the amount exceeds 10 weight parts, there will occur shrinkage on hardening in the phenol resin which results in deterioration of adhesive property relative to the repairing surface. Further, it is preferred that this phenol resin be used in the form of powder or pellets most of which have a particle size ranging from 0.1 to 1 mm. As the phenol resin, resol type resin having heat-hardening property may be used. Alternatively, it is also possible to employ novolak type resin in combination with a hardening agent such as hexamethlenetetramine.

Further, when used as casting material, it is preferred that carbon fiber be added thereto. The carbon fiber can contribute to avoidance of sagging of the repairing material and to provision of spalling resistance thereto. It can also promote diffusion of pitch thereby to help form uniform and strong carbon bond. As this carbon fiber, organic fiber type having a diameter of 5 to 30 $\mu$m and a length of 0.5 to 10 mm such as acrylonitrile or rayon, pitch type such as petroleum or coal-tar pitch, or any other commercially available carbon fiber may be employed. Although the fiber may be of either straight type or curled type, the curled type is preferred, since in the case of gunning material for example, mutual entangling of fibers occurs in the course of gunning operation thereby to increase the strength of the mending material. The amount of carbon fiber used is between 0.01 and 0.5 weight part. If the amount is not greater than 0.01 weight part, the addition of the fiber does not provide the expected effect. Whereas, if the amount exceeds 0.5 weight part, the gunning operation using a gunning machine will become difficult, and also the physical properties of the applied material will significantly deteriorate.

In addition to the respective components as specified above, addition also of super fine powder of e.g. silica or alumina type of 10 $\mu$m or less is also advantageous as the addition may improve the applicability. Especially, silica type super fine powder is preferred in terms of cost. Also, the addition of metal powder such as silicon and aluminum contributes improvement of hot strength of the mending material. In addition, other various additives commonly used in monolithic refractories may be used also.

In manufacturing monolithic refractory according to the present invention, to the particle-size-conditioned refractory material and pitch described above, bonding material such as various kinds of phosphates or alumina cement, depending on the purpose of use, may be added. In the case of repairing material which requires fluidity, in addition to the pitch having a high softening point according to the invention, pitch of a lower softening point may be employed. But, the amount of such pitch of lower softening point should be less than the pitch according to the present invention.

Further, depending on the necessity, common additives such as dispersant, plasticizer, hardening adjustment agent, water reducing agent, solvent or the like may be added. Also, metal or alloy including Al, Si, Mg or the like may be used in combination.

The application method of the present invention should be conveniently selected, depending on the particular purpose, from casting, vibration forming, ramming, tamping, gunning, throwing type repairing and so on. In case the application is effected as casting material or gunning material, at the time of its application, the above-described mixture will be added with an appropriate amount of water.

As some specific materials and application examples, the following may be cited. Namely, as casting material, alumina type refractory material is selected to be used as hot-melt preliminary treating furnace material, trough material for blast furnace. As material, magnesia type refractory material is employed to be used in a converter. As burning type hot repairing mix, basic material is employed to be used in a converter, a molten-steel ladle, or an electric furnace. Further, alumina type material will be used in a hot-metal ladle or the like. As ramming material or tamping material, alumina type material is employed for use in a hot-melt preliminary treating vessel.

As described hereinbefore, the monolithic refractory according to the present invention is characterized by the use of the pitch having a softening point of 250° to 350° C. and fixed carbon of 65 to 90 wt %. This pitch, in comparison with that used in the conventional monolithic refractory, has a higher softening point and a smaller amount of volatile component. Accordingly, when this is. used in casting material or the like, the applied material has already obtained sufficient strength before the pitch melts and the volatile component evaporates. Also, as the pitch is low in its content of volatile component, there is no risk of crack in the application. Further, even added in a large amount, since the applied material has already obtained strength and also the viscosity does not sharply decline unlike the convention, there occurs no deformation or sagging of the applied material. Thus, this has superior form stability.

In addition to the above-described features, the pitch has a high softening point and a large amount of fixed carbon. Therefore, at a high temperature, graphitization of the pitch is promoted, whereby strong and dense carbon bond may be formed. As a result, the hot strength, creeping resistance, and adhesiveness relative to a substrate of the application is improved. Further, this formation of carbon bond improves hot spalling resistance and restricts slag penetration, whereby the durability of the applied material may be significantly improved.

If the phenol resin is added with the pitch in the monolithic refractory according to the present invention, at high temperature, first the added phenol resin softens and melts by the heat retained within the molten-metal vessel, and hardens while the resin adheres to the repairing surface together with the refractory material. The phenol resin used in the invention has high heat-hardening property and high molecular weight, it softens by a very limited degree, so that the material may proceed to hardening process without sagging of the entire material. Further, the phenol resin makes it possible to add the pitch of 10 weight parts or more. In general, addition of such large amount of pitch is impossible. This is possibly because the heat-hardening type phenol resin is usually hardened at 150° to 200° C. and when the pitch having a softening point higher than 250° C. begins to melt, the phenol resin within the applied material has already obtained such degree of strength as to prevent deformation of pitch inside.

Furthermore, the present of fiber carbon can contribute to dispersion of pitch which becomes softer and fluid with temperature rise in the applied material, thereby to facilitate formation of uniform carbon bond. As the melt pitch is diffused over the surface of the carbon fibers, with flow of the pitch, the carbon fibers which were forcibly curled or bent become now stretched to the position that was previously occupied by the pitch, and the pitch becomes carbonized about the carbon fibers. Therefore, uniform carbon bond may be formed within the applied material.

Next, specific examples of various monolithic refractories according to the present invention will be described.

Of the pitches employed, pitch 1 has a softening point of 150° C. and 60 wt % of fixed carbon; and pitch 2 has a softening point of 280° C. and 81 wt % of fixed carbon; pitch 3 has a softening point of 340° C. and 88 wt % of fixed carbon; and pitch 4 has a softening point of 375° C. or higher and 92 wt % of fixed carbon, respectively.

Of the phenol resins employed, phenol resin 1 is a novolak type (hexamethlenetetramine used in combination) having an average molecular weight of about 1500; phenol resin 2 is a resol type having an average molecular weight of about 900; phenol resin 3 is a novolak type (hexamethlenetetramine used in combination) having an average molecular weight of about 3000; and phenol resin 4 is a resol type having an average molecular weight of about 6000, respectively.

All of carbon fibers employed are pitch type including straight type having a fiber diameter of 13 um and fiber length of 0.7 mm and curled type having a fiber diameter of 18 um and a fiber length of 3 mm.

Referring to tests of various properties, for testing adhering strength, an iron pipe having a diameter of 80 mm was placed on a hot brick heated up to the indicated temperature and monolithic refractory was applied within the pipe. After lapse of a predetermined time period, a shearing force was applied under the hot condition and the shearing force at the time of rupture was measured. Further, for testing corrosion resistance, a rotary slag testing machine was employed. On a sample having been tested for a predetermined time period with the indicated slag, a melting depth and a slag penetration depth were measured at its cut face. The durability of gunning material is represented by the number of running charges (ch) until no material remained.

As a magnesia type hot-spray material, materials shown in Table 1 were tested. The properties of the respective materials after gunning thereof and results of various tests effected thereon are also shown in Table 1. Comparison examples effected in the same manner are shown in Table 2. The slag used in the corrosion resistance tests is converter slag of C/S=3.4. And, the test was conducted for 5 hours at 1650° to 1700° C.

In the case of the embodiments shown in Table 1, none showed any rebound loss, sagging or cracking at the time of application. And, all show durability of more than 7 charges. As may be seen in the embodiment 1 and the comparison example 1, the use of the pitch according to the invention provides improvement in bonding strength though improvement in adhesion rate is rather limited. Further, the significant improvement in the durability indicates formation of suitable carbon bond within the application. Moreover, the use of heat-hardening type phenol resin further improves the bonding performance and durability.

Next, Table 3 shows examples in which alumina-silicon carbide type were employed as casting material. The slag used in the corrosion resistance test was dephosphorizing agent (composition: $Fe_2O_3$ 43%, CaO 42%, $CaF_2$ 12%), and the testing condition was 1350° C. for 3 hours.

When the pitches having a high softening point and high fixed carbon according to the invention were added to the system comprised solely of silica flower and alumina cement (comparison example 5), no rupture occurs in the course of heating (respective embodiments). Whereas, with use of pitches out of the scope of the invention (comparison examples 6, 7), cracking and/or rupture occur. Here, the employment of the pitch having a high softening point and a high fixed carbon amount shows significant improvement in the hot strength and corrosion resistance due to formation of uniform and strong carbon bond.

Table 4 shows results of alumina-silicon carbide-graphite type tamping materials. Here, significant improvement in prevention of rupture and in corrosion resistance may be seen. Incidentally, in the test of corrosion resistance, the same desphosphorizing agent as shown in Table 3 was used under the conditions of 1500° C. for 5 hours.

Table 5 shows examples in which the burning type hot repairing mix material of the invention was used in an actual converter. In these, magnesia type repairing mix materials shown in Table 5 were applied to a charging wall of the converter (embodiment 20 and comparison example 11) and to a bottom (embodiment 21 and comparison example 12) horizontally, and to a tilted discharging side slagline section (embodiment 20 and comparison example 13), respectively.

Table 6 shows results of throwing type repairing operations in which alumina-spinel type material contained within a small bag was manually thrown to repair a metal charging portion of a torpedo-car. The materials using the pitches according to the invention show good adhesion even when applied to such tilted surface and a significant amount of material remained even after 3 (three) charges.

In these examples of burning type hot repairing mix too, significant improvement in the hot strength and corrosion material, gunning material, burning type hot repairing mix, tamping material, ramming material or the like. Moreover, the pitch according to the invention may be used singly or in combination with conventional bonding agent.

TABLE 1

|  | embodiments | | | | | | | | | |
|---|---|---|---|---|---|---|---|---|---|---|
|  | 1 | 2 | 3 | 4 | 5 | 6 | 7 | 8 | 9 | 10 |
| composition (weight parts) | | | | | | | | | | |
| magnesia | | | | | | | | | | |
| 3–1 mm | 30 | 30 | 30 | 30 | 30 | 30 | 30 | 30 | 30 | 30 |
| 1–0.125 mm | 30 | 30 | 30 | 30 | 30 | 30 | 30 | 30 | 30 | 30 |
| <0.125 mm | 40 | 40 | 40 | 40 | 40 | 40 | 40 | 40 | 40 | 40 |
| pitch | | | | | | | | | | |
| 1 <1 mm | | | | | | | | | | |
| 2 <1 mm | 4 | 8 | 12 | | 4 | 4 | 4 | 4 | 4 | 4 |
| 3 <1 mm | | | | 8 | | | | | | |
| 4 <1 mm | | | | | | | | | | |
| phenol resin | | | | | | | | | | |
| 1 | | | | | | | | | | |
| 2 | | | | | | | | | | |
| 3 | | | | | | | 4 | | | |
| 4 | | | | | | | | 8 | 4 | 4 |
| carbon fiber (straight) | | | | | | 0.05 | | | 0.05 | |
| carbon fiber (curled) | | | | 0.05 | 0.15 | | | | | 0.15 |
| sodium phosphate | 4 | 4 | 4 | 4 | 4 | 4 | | | | |
| calcium hydroxide | 3 | 3 | 3 | 3 | 3 | 3 | | | | |
| fixing ratio % at 1200° C. | 76 | 81 | 75 | 71 | 74 | 80 | 69 | 75 | 74 | 78 |
| sprayed result | good | good | good | good | good | good | good | good | good | good |
| bonding strength kPa at 1000° C. | 151 | 204 | 187 | 192 | 224 | 169 | 256 | 300 | 340 | 320 |
| physical properties | | | | | | | | | | |
| apparent porosity % | 31.4 | 32.0 | 34.2 | 35.6 | 34.8 | 31.9 | 28.7 | 32.9 | 32.8 | 33.5 |
| bulk specific gravity | 2.17 | 2.11 | 2.06 | 2.08 | 2.08 | 2.16 | 2.06 | 2.06 | 2.08 | 2.03 |
| hot bending strength MPa | 1.8 | 1.9 | 2.6 | 1.9 | 2.9 | 2.1 | 4.4 | 4.4 | 3.9 | 3.8 |
| corrosion resistance melt loss amount mm | 11.0 | 10.4 | 15.4 | 16.2 | 12.2 | 11.2 | 13.4 | 14.4 | 12.2 | 12.1 |
| actual running charges ch | 6 | 5 | 6 | 7 | 8 | 7 | 8 | 9 | 12 | 11 | resistance due to reinforcement of the carbon and densification by the use of the pitch having a high softening point and high fixed carbon content and also distinguished effect in the applicability too may be seen. Namely, these show significant reduction in the baking time period due to appropriate degree of fluidity and resultant applicability to a tilted portion of a molten metal vessel. By selecting the properties of pitch within the scope of the present invention, the baking time may be significantly reduced, and sagging may be avoided and speedy adhesion is made possible.

Table 7 shows examples of mortar for use in lining a furnace with conventional alumina-magnesia-carbon carbon bricks for wall of an LF ladle. After use of 121 charges, the brick furnace was disassembled and penetration of ore into the joints was observed. In the case of all of the materials of the embodiments, the joints were maintained firmly to resist penetration by ore.

The present invention uses a pitch having a high softening point and a high fixed carbon in order to solve the drawbacks of the conventional monolithic refractories using pitch or tar such as rupture, lack of low shrinkage, low bonding strength, low hot strength. As a result, there has been achieved monolithic refractory capable of the above drawbacks and having both superior strength and superior applicability. The monolithic refractory of the invention using pitch having a high softening point and a high fixed carbon content may be used as any type of monolithic refractory such as casting

TABLE 2

|  | comparison examples | | | |
|---|---|---|---|---|
|  | 1 | 2 | 3 | 4 |
| composition (weight parts) | | | | |
| magnesia | | | | |
| 3–1 mm | 30 | 30 | 30 | 30 |
| 1–0.125 mm | 30 | 30 | 30 | 30 |
| <0.125 mm | 40 | 40 | 40 | 40 |
| pitch | | | | |
| 1 <1 mm | | 4 | | |
| 2 <1 mm | | | | |
| 3 <1 mm | | | | 4 |
| 4 <1 mm | | | 4 | |
| phenol resin | | | | |
| 1 | | | | |
| 2 | | | | |
| 3 | | | | |
| 4 | | | | |
| carbon fiber (straight) | | | | 1 |
| carbon fiber (curled) | | | | |
| sodium phosphate | 4 | 4 | 4 | 4 |
| calcium hydroxide | 3 | 3 | 3 | 3 |
| fixing ratio % at 1200° C. | 73 | 59 | 59 | 43 |

TABLE 2-continued

|  | comparison examples | | | |
|---|---|---|---|---|
|  | 1 | 2 | 3 | 4 |
| sprayed result | laminar peeling | hexagonal crack | laminar peeling | rebound |
| bonding strength kPa at 1000° C. | 30 | 87 | 45 | 60 |
| physical properties | | | | |
| apparent porosity % | 33.4 | 35.7 | 34.0 | 44.1 |
| bulk specific gravity | 2.29 | 2.11 | 2.14 | 1.81 |
| hot bending strength MPa | 1.3 | 1.5 | 1.8 | 0.9 |
| corrosion resistance melt loss amount mm | 7.30 | 18.1 | 17.4 | 20.3 |
| actual running charges ch | 3 | 2 | 2 | 1 |

TABLE 3

|  | embodiments | | | | | | comparison examples | | |
|---|---|---|---|---|---|---|---|---|---|
|  | 11 | 12 | 13 | 14 | 15 | 16 | 5 | 6 | 7 |
| composition (weight parts) | | | | | | | | | |
| alumina | | | | | | | | | |
| 5–1 mm | 40 | 40 | 40 | 40 | 40 | 40 | 40 | 40 | 40 |
| 1–0.125 mm | 25 | 25 | 25 | 25 | 25 | 25 | 25 | 25 | 25 |
| <0.125 mm | 25 | 25 | 25 | 25 | 25 | 25 | 25 | 25 | 25 |
| silicon carbide <1 mm | 10 | 10 | 10 | 10 | 10 | 10 | 10 | 10 | 10 |
| pitch | | | | | | | | | |
| 1 <1 mm |  |  |  | 1 |  |  | 3 | 6 |  |
| 2 <1 mm | 3 | 6 | 9 |  | 3 | 3 |  |  |  |
| 3 <1 mm |  |  |  | 2 |  |  |  |  |  |
| 4 <1 mm |  |  |  |  |  |  |  |  | 5 |
| carbon fiber (straight) |  |  |  |  | 0.15 | 0.3 |  |  | 0.15 |
| silica flower | 1 | 1 | 1 | 1 | 1 | 1 | 1 | 1 | 1 |
| alumina cement | 4 | 4 | 4 | 4 | 4 | 4 | 4 | 4 | 4 |
| phosphate type dispersant | 0.3 | 0.3 | 0.3 | 0.3 | 0.3 | 0.3 | 0.3 | 0.3 | 0.3 |
| added moisture % | 6.5 | 6.5 | 6.5 | 6.5 | 6.5 | 6.5 | 6.5 | 6.5 | 6.5 |
| rapture test (at 600° C.) | ○ | ○ | ○ | ○ | ○ | ○ | Δ | x | ○ |
| physical properties (1400° C. 3 hr) | | | | | | | | | |
| apparent porosity % | 22.0 | 22.7 | 23.1 | 21.9 | 22.8 | 22.3 | 24.1 | 26.0 | 22.0 |
| bulk specific gravity | 2.75 | 2.70 | 2.64 | 2.75 | 2.78 | 2.76 | 2.70 | 2.63 | 2.77 |
| compressing strength MPa | 42 | 39 | 30 | 37 | 45 | 48 | 25 | 31 | 11 |
| hot bending strength MPa (at 1400° C.) | 2.7 | 2.8 | 3.1 | 2.5 | 3.1 | 3.4 | 1.3 | 2.0 | 0.4 |
| corrosion resistance melt loss amount mm | 5.5 | 5.5 | 6.1 | 5.3 | 5.7 | 5.4 | 7.9 | 11.4 | 10.2 | note: rupture test
○: normal
Δ: cracked
x: collapsed

TABLE 4

|  | embodiments | | | comparison examples | | |
|---|---|---|---|---|---|---|
|  | 17 | 18 | 19 | 8 | 9 | 10 |
| composition (weight parts) | | | | | | |
| alumina | | | | | | |
| 5–1 mm | 40 | 40 | 40 | 40 | 40 | 40 |
| 1–0.125 mm | 20 | 20 | 20 | 20 | 20 | 20 |
| <0.125 mm | 25 | 25 | 25 | 25 | 25 | 25 |
| silicon carbide <1 mm | 10 | 10 | 10 | 10 | 10 | 10 |
| black lead <1 mm | 5 | 5 | 5 | 5 | 5 | 5 |
| pitch | | | | | | |
| 1 <1 mm |  |  |  |  | 3 |  |
| 2 <1 mm | 3 | 6 | 3 |  |  |  |
| 4 <1 mm |  |  |  |  |  | 3 |
| carbon fiber (straight) |  |  | 0.05 |  |  |  |
| clay | 2 | 2 | 2 | 2 | 2 | 2 |
| alumina cement | 2 | 2 | 2 | 2 | 2 | 2 |
| phosphate type dispersant | 1 | 1 | 1 | 1 | 1 | 1 |
| rapture test (at 600° C.) | ○ | ○ | ○ | ○ | x | Δ |
| physical properties (1400° C. 3 hr) | | | | | | |
| apparent porosity % | 20.8 | 22.7 | 21.1 | 21.0 | 22.7 | 21.5 |
| bulk specific gravity | 2.66 | 2.65 | 2.64 | 2.69 | 2.65 | 2.64 |
| compressing strength MPa | 60 | 54 | 64 | 33 | 42 | 27 |
| bonding strength MPa | 1.8 | 1.6 | 1.9 | 0.9 | 1.4 | 1.1 |

TABLE 4-continued

|  | embodiments | | | comparison examples | | |
|---|---|---|---|---|---|---|
|  | 17 | 18 | 19 | 8 | 9 | 10 |
| (1300° C. 3 hr) corrosion resistance melt loss amount mm | 10.7 | 11.0 | 10.3 | 12.5 | 15.1 | 14.8 | note: rupture test
o: normal
Δ: cracked
x: collapsed

TABLE 5

|  | embodiments | | | | comparison examples | | |
|---|---|---|---|---|---|---|---|
|  | 20 | 21 | 22 | 23 | 11 | 12 | 13 |
| composition (weight parts) | | | | | | | |
| magnesia | | | | | | | |
| >1 mm | 45 | 50 | 55 | 45 | 45 | 50 | 55 |
| <1 mm | 55 | 50 | 45 | 55 | 55 | 50 | 45 |
| pitch | | | | | | | |
| 1 <1 mm | | 23 | | | 8 | 25 | 18 |
| 2 <1 mm | 8 | 2 | 18 | 8 | | | |
| carbon fiber (straight) | | | | 0.1 | | | |
| particle phenol resin 0.2–1.2 mm | | | 5 | | | | 5 |
| liquid novolak type phenol resin | 17 | | | 17 | 17 | | |
| physical properties (1000° C. application) | | | | | | | |
| apparent porosity % | 27.9 | 29.9 | 33.4 | 28.4 | 29.4 | 30.1 | 36.4 |
| bulk specific gravity | 2.34 | 2.19 | 2.06 | 2.31 | 2.27 | 2.24 | 2.01 |
| bonding strength MPa (1300° C. 3 hr) | 1.3 | 1.8 | 1.4 | 1.4 | 0.8 | 1.6 | 1.4 |
| hot bending strength MPa (at 1400° C.) | 3.8 | 3.1 | 4.0 | 4.2 | 2.1 | 2.3 | 2.6 |
| applicability | | | | | | | |
| baking time min | 21 | 32 | 1 | 21 | 28 | 34 | 25 |
| application to sloped face | | | possible | | | | not possible |
| running charges ch | 9 | 12 | 7 | 10 | 3 | 8 | — | note: no application was possible with comparison example 13

TABLE 6

|  | embodiments | | | comparison examples | |
|---|---|---|---|---|---|
|  | 24 | 25 | 26 | 14 | 13 |
| composition (weight parts) | | | | | |
| alumina | | | | | |
| >1 mm | 40 | 40 | 40 | 40 | 40 |
| <1 mm | 20 | 20 | 20 | 20 | 20 |
| spinel | | | | | |
| >1 mm | 10 | 10 | 10 | 10 | 10 |
| <1 mm | 30 | 30 | 30 | 30 | 30 |
| pitch | | | | | |
| 1 <1 mm | | 4 | | 12 | |
| 2 <1 mm | 12 | 8 | 12 | | |
| 4 <1 mm | | | | | 12 |
| carbon fiber (straight) | | | 0.1 | | |
| particle novolak type phenol resin | 7 | 7 | 7 | 7 | 7 |
| applicability to sloped face | good | good | good | sagging | good |
| physical properties (1000° C. application) | | | | | |
| apparent porosity % | 33.5 | 34.3 | 33.8 | 36.2 | 31.4 |
| bulk specific gravity | 2.12 | 2.07 | 2.10 | 2.02 | 2.14 |
| bonding strength MPa | 2.1 | 1.9 | 2.2 | 1.6 | 0.2 |
| (1000° C. 3 hr) remaining ratio % | 40 | 35 | 45 | 0 | 0 |

TABLE 7

|  | embodiments | | comparison examples |
|---|---|---|---|
|  | 27 | 28 | 16 |
| composition (weight parts) | | | |
| alumina | | | |
| <0.3 mm | 30 | 30 | 30 |
| fine powder | 65 | 65 | 65 |

TABLE 7-continued

|  | embodiments | | comparison examples |
|---|---|---|---|
|  | 27 | 28 | 16 |
| clay fine powder | 5 | 5 | 5 |
| pitch 2 <0.5 mm | 6 | 6 |  |
| carbon fiber (curled) |  | 0.06 |  |
| sodium silicate | 2.5 | 2.5 | 2.5 |
| applicability | good | good | good |
| ore penetration into joint | no | no | yes |

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

We claim:

1. A monolithic refractory comprising 1 to 30 parts by weight of a pitch comprising 65 to 90 wt.-% fixed carbon, wherein said pitch has a softening point greater than 250° C. but less than 350° C.; and 2 to 10 parts by weight of heat-hardening phenol resin having an average molecular weight of at least 2000.

2. The monolithic refractory according to claim 1, further comprising 0.01 to 0.5 part by weight of carbon fiber.

3. A gunning material comprising the monolithic refractory according to claim 1.

4. The monolithic refractory according to claim 1, wherein said pitch is present in an amount of 1 to 15 parts by weight.

5. A casting material comprising the monolithic refractory according to claim 1.

6. The monolithic refractory according to claim 1, wherein said pitch is present in an amount of 1 to 12 parts by weight.

7. A repair mix comprising the monolithic refractory according to claim 1.

8. A tamping material comprising the monolithic refractory according to claim 1.

9. The monolithic refractory according to claim 1, wherein said pitch is present in an amount of 2 to 10 parts by weight.

10. A gunning material comprising 1 to 15 parts by weight of pitch comprising 65 to 90 wt.-% fixed carbon, said pitch having a softening point greater than 250° C. but less than 350° C.; and 2 to 10 parts by weight of a heat-hardening phenol resin having an average molecular weight of at least 2000.

11. The gunning material according to claim 10, further comprising 0.01 to 0.5 parts by weight of carbon fiber.

* * * * *